United States Patent
Couch

(10) Patent No.: US 6,173,522 B1
(45) Date of Patent: *Jan. 16, 2001

(54) FISHING LURE HAVING A LATERAL SURFACE RUN AND METHOD

(76) Inventor: James A. Couch, 348 U-Wharri Mt. Rd., Pickens, SC (US) 29671

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/248,953

(22) Filed: Feb. 12, 1999

(51) Int. Cl.[7] .................................................. A01K 85/00
(52) U.S. Cl. ........................ 43/42.22; 43/42.32; 43/42.23; 43/42.39; 43/42.47
(58) Field of Search ........................ 43/42.22, 42.24, 43/42.32, 42.35, 42.39, 42.45, 42.48, 42, 42.37, 42.47, 42.49

(56) References Cited

U.S. PATENT DOCUMENTS

| 1,813,843 | * | 7/1931 | Flood . | |
| 3,139,693 | * | 7/1964 | Newman . | |
| 3,243,912 | * | 4/1966 | Newman . | |
| 4,037,348 | * | 7/1977 | Kruger | 43/42.23 |
| 5,113,608 | * | 5/1992 | Hook | 43/42.49 |
| 5,381,623 | * | 1/1995 | Crisp | 43/42.43 |

* cited by examiner

Primary Examiner—Jack W. Lavinder
(74) Attorney, Agent, or Firm—Ralph Bailey, P.A.

(57) ABSTRACT

A fishing lure provides a lateral surface run during retrieval by utilizing a generally upright front surface (A) extending across an integral body which floats or is generally of substantially neutral buoyancy. A weight (B) is carried by the lure body to adjust the balance and path traversed during retrieval and to maintain a generally upright side wall (D) in position for attachment of a line to a connector (C) located in an elongated tunnel (E) intermediate upper and lower edges of the tunnel. The method contemplates utilizing an upright front surface (A) tapering across the lure body for providing lateral direction during retrieval, together with the step of fixing a connector to an upright side from about ¼ to about ⅓ of the length of the body from the front.

12 Claims, 4 Drawing Sheets

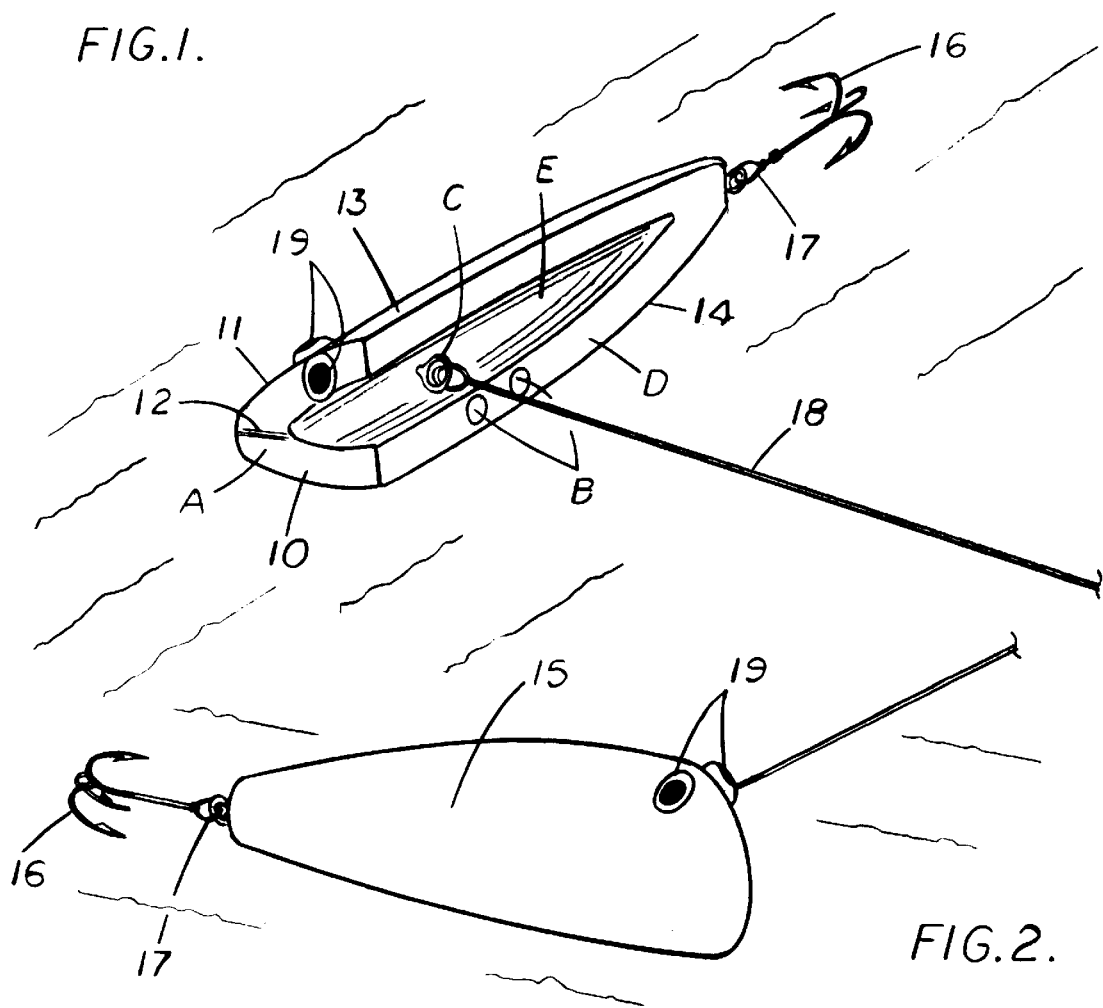
FIG.1.
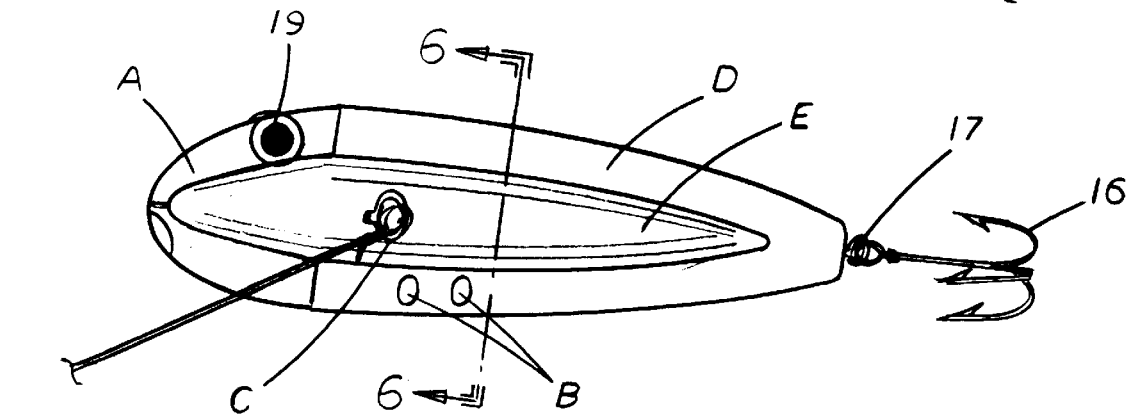
FIG.2.
FIG.3.

FISHING LURE HAVING A LATERAL SURFACE RUN AND METHOD

BACKGROUND OF THE INVENTION

This invention relates to fishing lures and method and more particularly to a top water lure having a lateral run during retrieval following casting, facilitated by an upright tapered front and flat side to which a line is attached far enough to the rear of the lure to direct the lure's path.

It is an object of the present invention to provide a fishing lure having an integral floating body providing a run extending toward the right or the left so as to go toward obstructions in the water or to go under overhanging branches. Since fish often are to be found near or around structures or shaded areas such as under overhanging branches of bodies of water where obstructions are most likely to occur, maneuverability is an important attribute of a successful lure. The likelihood that lures will become entangled when stumps, dock posts and the like are encountered makes a solution to the problem all the more desirable. By varying weight distribution toward a central location a single lure may be made to go either way.

The prior art is best shown by U.S. Pat. Nos. 4,674,224, 5,058,309, and 5,638,632. U.S. Pat. No. 5,058,309 illustrates a steerable fishing lure capable of runs or continuous traverses to the right or to the left depending upon adjustment of the line fastening apparatus. The body of the lure is not integral and does not float. The lure does not have a capability of backing out of cramped quarters such as when the lure is passed about stumps, posts, and the like. The term "integral" is used herein in its broadest sense to mean parts which are or may be fixed together so as to be unified as opposed to formed in a single piece of material.

U.S. Pat. No. 5,638,632 illustrates a top water lure configured to include an S-shaped integral body. This lure is capable of oscillating continuously during retrieval when casting but does not provide continuous directional movement such as right-hand or left-hand runs. U.S. Pat. No. 4,674,224 illustrates a trolling lure having an integral body with a transverse medial groove for adjusting the positioning of hooks so as to vary the disposition of weight and hence the inclination of the lure with respect to a horizontal axis.

SUMMARY OF THE INVENTION

Accordingly, it is an important object of the invention to provide a fishing lure with a lateral surface run during casting.

Another important object of the invention is to provide a floating plug capable of being backed away from obstructions such as stumps and posts which become engaged by the line and lure during retrieval after casting.

Another important object of the invention is the provision of a lure having a body of simplified integral construction which is capable of floating and which is hydrodynamically configured so as to avoid turbulent flow and to provide stability during retrieval.

Another important object of the invention is to provide a fishing lure having a body which is of integral construction in the form of natural bait such as a minnow generally in the shape of a herring, shad, trout or other small fish.

Still another object of the invention is to provide a fishing lure which may be inexpensively constructed, capable of floating and which may be decorated in such a way as to simulate live bait. This lure can be made to mimic the action of a bait fish.

Another important object of the present invention is to provide a top water plug capable of maneuvering in right or left-hand runs during casting. Generally, a particular lure will be constructed in accordance with the invention to either go to the right or to the left but it is possible that weight distributions may be varied so as to change directions after a run of a given length and duration has been attained.

Another important object of the invention is the provision of a lure having a body with a generally upright inclined front surface or lip and an upright wall extending rearwardly therefrom on one side of the body with provision for attaching the line at a position rearwardly of the front surface to direct the lure on a lateral run. The head essentially forms the lip.

Another important object of the invention is to provide a lure having a body generally in the configuration of natural bait capable of producing a lateral surface run during retrieval with weights positioned to govern the inclination of the lure in respect to a transverse axis.

Still another important object of the invention is to provide a lure having an elongated tunnel, open at the front and along one side of the lure so as to provide hydrodynamic stability during retrieval of the lure, facilitating positioning of a line connector for causing the lure to go to the right or to the left and to back out of engagement with obstructions in the water or can be made to reverse directions with each engagement with central weight distribution of the lure.

Lures constructed in accordance with the invention provide a generally flat upright surface in the shape of a minnow body providing attachment with weighting sufficient to maintain the lure vertically in the water, with a generally upright front surface inclined across the body to facilitate lateral runs of the lure during casting. It is significant that a central tunnel opening at the front extends rearwardly for enhancing hydrodynamic qualities and facilitating a positioning of a line connector eye so that line attachment may be close to the center of weight of the body for better control over the action of the lure.

While the invention is described in terms of a casting lure providing lateral surface runs upon retrieval it may be possible to utilize similar configurations in other lures capable of use in trolling or in casting at varying depths. Other lure actions may be achieved by varying the amount and positioning of the weights in combination with other features of the invention which may also be altered to achieve desired lure characteristics. Weighting is an important feature of the present invention because weight is desirable to maintain a stable position or depth in the water and to avoid an excessive tendency toward diving. Weight is preferably concentrated in a forward portion of the body to provide balance about a transverse axis. The lure appears to be formed in the configuration of a normal lure divided vertically along a horizontal axis. However, the general thickness of a normal lure is maintained in the subject lure with material added at the top and bottom to form an upright wall with sharp edges at upper and lower extremities.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating a fishing lure, constructed in accordance with the invention, looking toward an upright wall which provides a somewhat flat surface on one side of the lure permitting attachment of a line adjacent to an upright front surface tapering from one side across the body toward a head of the lure;

FIG. 2 is a rear perspective view also looking from the front toward the lure of FIG. 1;

FIG. 3 is a side elevation further illustrating the upright wall of the lure and its juncture with the upright tapering front surface, as well as weighting and line attachment utilized in conjunction therewith;

DESCRIPTION OF A PREFERRED EMBODIMENT

Figure 4:
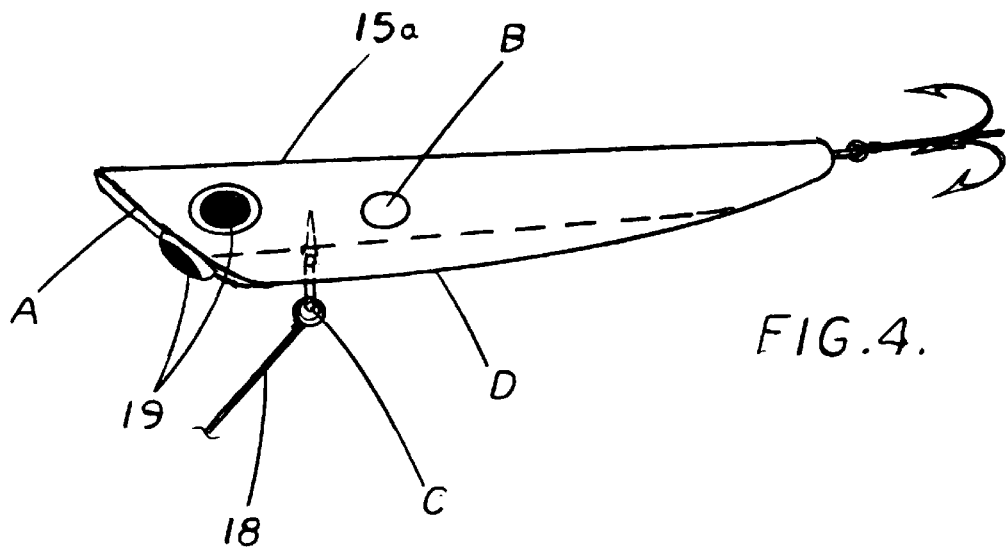
FIG. 4 is a top plan view illustrating a modified form of the invention wherein the lure may be weighted at an upper edge or side portion of the lure to vary the path traversed by the lure during retrieval.

The drawings illustrate a fishing lure for providing a lateral surface run during casting having an elongated, integral horizontal body with a head tapering toward a front end, and a body profile including a surface tapering inwardly rearwardly of the body in general shapes characteristic of natural bait. The body has a generally upright front surface A extending forwardly from one side across the body toward the front end of the head. A weight B is carried by the body, and a line connector C is fixed on a forward portion of the body intermediate upper and lower edges of the body rearwardly of the front surface on the one side sufficiently distant from the front end of the head to cause the line to extend at an angle to the body providing a lateral run during retrieval of the lure during casting. A fishhook connector is suitably fixed to the body for fastening at least one fishhook to the body. The line connector is fixed on the body preferably rearwardly of the inclined front surface from about ¼ to about ⅓ the distance from the front end to a rear end of the body. The one side includes a surface defining an upright wall D extending from a juncture with the upright front surface rearwardly of the body. The juncture may include a beveled surface. A tunnel E opens at a front central portion of the wall and extends rearwardly of the body, and the line connector is positioned centrally between an upper and lower edge of the tunnel.

The fishing lure preferably has a body constructed of molded plastic providing an internal cavity or a resin foam so that the body floats or has a substantially neutral buoyancy.

The method contemplates utilizing the upright front surface A integral with the body and inclined at an acute angle at the front end extending from one side across the body toward the front end for providing a lateral direction when retrieving the line during casting, weighting a lower forward portion of the body maintaining a generally upright position of the lure during retrieval, and fixing a line connector on a forward portion of the body on the one side from about ¼ to about ⅓ the length of the body from the front end of the head to cause the line to extend at an angle to the body providing a lateral run of the lure during retrieval of the lure during casting. The method further contemplates the steps of making the one side generally flat, and forming an elongated central tunnel in the flat side opening adjacent to the upright front surface and extending rearwardly of the body.

It is important that the one side operating in conjunction with the upright front surface provides direction to the lure resulting in a lateral run and the ability to turn toward an obstacle for the purpose of backing around obstructions. These features including line positioning and weighting may be adjusted to produce the desired results. Speed of retrieval is important in determining the path taken by a line constructed in accordance with the invention.

The embodiment of the invention illustrated in FIGS. 1, 2, and 3 may best be constructed of a light wood having a tunnel naturally occurring therein as in Palonia Wood. A generally upright front tapering surface A may be a composite of surfaces having different tapers such as illustrated as at 10 and 11 which generally taper somewhat outwardly having a juncture line illustrated as at 12 providing at least one generally planar uninterrupted upright front tapering surface extending substantially from top to bottom of the lure substantially smoothly at an acute angle across the body at the front end of the head for aiding in guiding the lure laterally. The lure body has a sharp or pointed upper edge 13 and an opposed lower pointed edge 14. A side of the lure 15 in FIG. 2 opposite the upright wall D is preferably arcuate joining the upper and lower edges 13 and 14 as preferably at beveled junctures. A concave bow or bend in the lure body is illustrated at 15a. This bow causes a slight fluttering action in the run of the lure.

A treble hook is illustrated as at 16 connected to a suitable eyelet 17 at the rear of the lures. The head of the lure is defined by the tapering surfaces 10 and 11 which form the upright tapering surface A and extend toward a pointed front end. It will be observed that the line 18 is attached at an angle to the body during retrieval as in FIGS. 1, 2, and 3. It will be further noted that the weight B is positioned at a lower portion forming a keel and that the wall D has a height greater than the width of the body. Weighting may be achieved in several ways including lead weights or thickened plastic ribs. The upright front tapering surface A is illustrated as being integral with the body although a separate member may be utilized for providing the upright tapering surface A.

Figure 5:
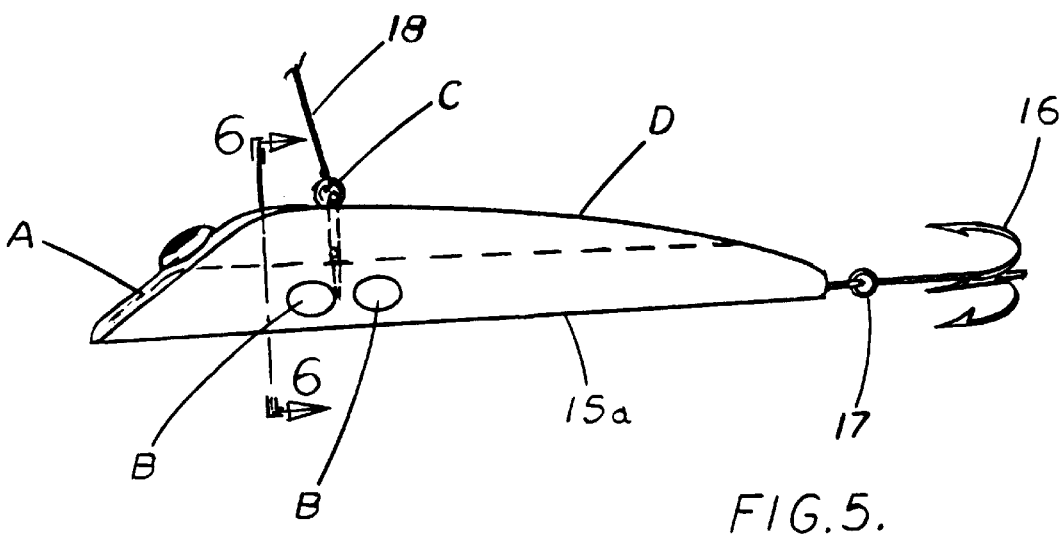
FIG. 5 illustrates a lower edge of the lure of FIG. 4 with additional weighting slightly closer to the front of the lure body.
Figure 6:
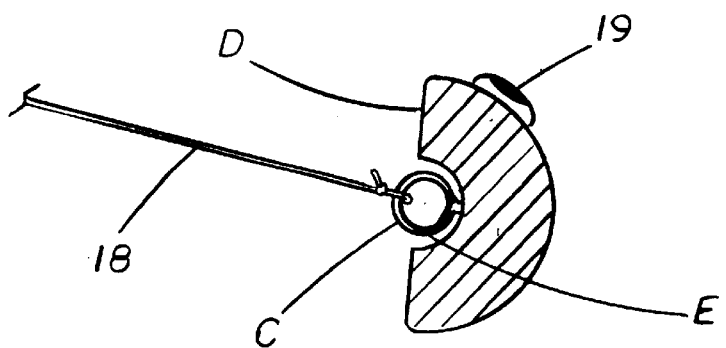
FIG. 6 is a transverse sectional elevation taken along the line 6—6 in FIG. 5.
Figure 8:
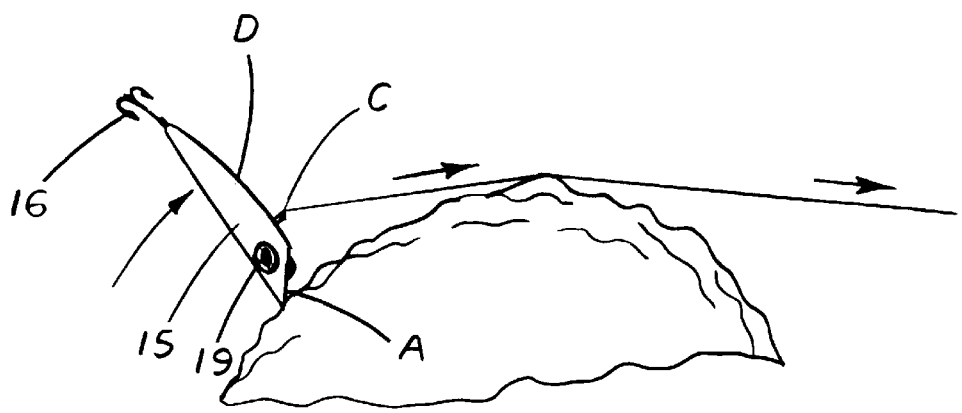
FIG. 8 is an illustration of the mode of extracting or backing a lure constructed in accordance with the invention away from an obstruction in the water wherein the lure, because of line attachment in combination with features of the present invention causes the lure to face toward the obstruction during further retrieval action, preferably at a slower rate.
Figure 7:
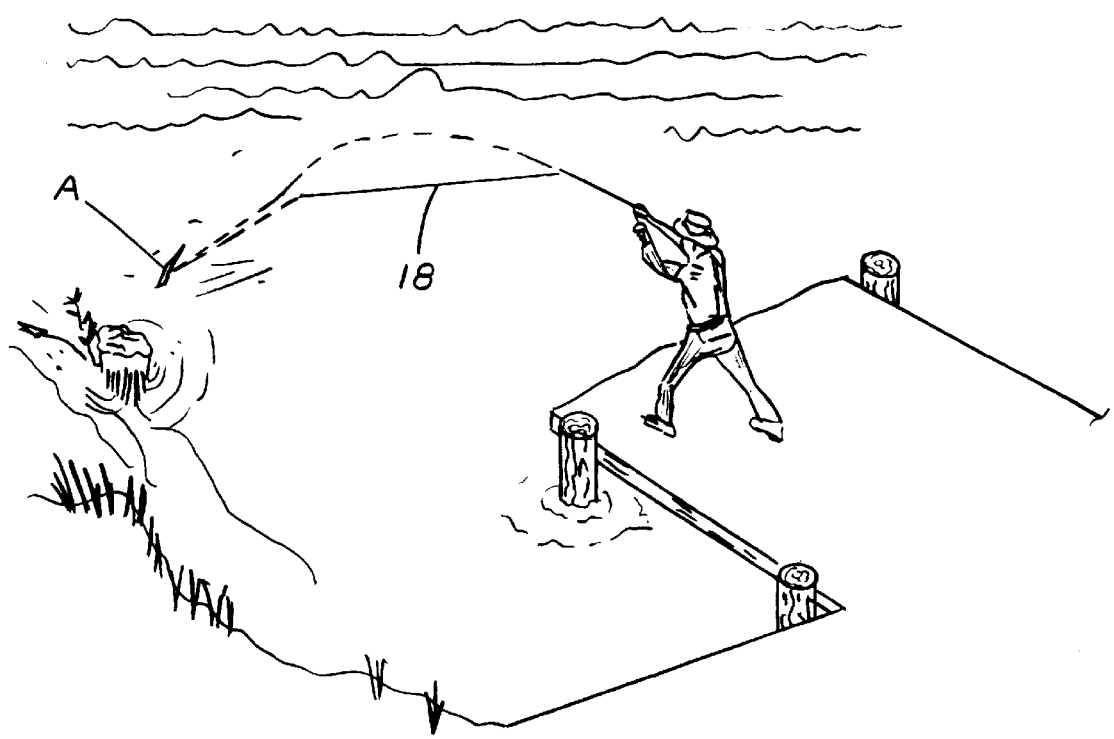
FIG. 7 illustrates casting a lure constructed in accordance with the invention to traverse a path on a left run towards obstructions where fish are likely to congregate. The run to the left is illustrated in a straight broken line toward the left, although this showing may be somewhat idealized in that the lure path may be curved or otherwise, depending on wind and water conditions as well as speed of retrieval.

The body is illustrated as including decorative features such as the eyes illustrated at 19, together with painting of the surfaces with varying colors or iridescent paints preferably providing a hard lacquer-like finish (not shown). The lures may preferably have a taper or lip on the front end as illustrated at A. The taper forms a front end having approximately a 30° to approximately a 35° angle with a longitudinal axis of the lure. Such top water lures generally vary in length from 3" to 6", in height at a highest point from ¾" to 1¼" and in thickness from ⅜" to ¾" although such dimensions are illustrative and not intended to be a size limitation. It should be noted that an upright front surface A tapering in a direction shown in FIG. 1 may cause a lure to proceed on run to left when casting as illustrated in FIG. 7. FIG. 8 best illustrates an important feature of lures constructed in accordance with the invention. It will be noted that by reducing speed of retrieval the lure may face an obstruction and back out of close quarters. This is facilitated by the combination of features including the flat wall D, line positioning and weighting. Weighting of the lure illustrated as at B further contributes to keeping the lures on course on a right or left run. If the positioning of the weights B is provided as in FIGS. 4, 5, and 6, then it has been found that the run to the left may proceed for a given duration with a reversal of direction occurring thereafter.

Figures 9, 10, 11:
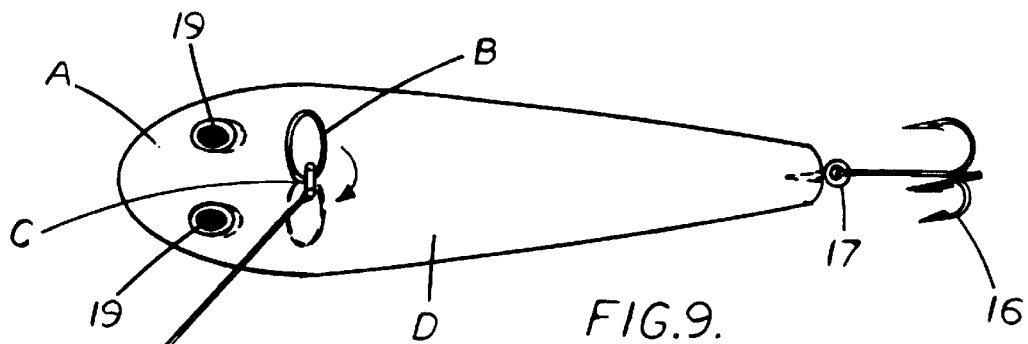
FIG. 9 is a side elevation of a lure constructed in accordance with a modified form of the invention looking toward an upright flat side of the lure having a weight carried by a swivel connector eye which also serves as a line connector being located centrally between upper and lower edges of the lure near the front.
FIG. 10 is a front elevation looking toward the front of the lure illustrated in FIG. 9 further illustrating adjustable positions of a weight for providing a capability of converting a left-hand lure into a right-hand lure.
FIG. 11 is a top plan view of the lure in FIGS. 9 and 10 with parts broken away showing a hollow interior cavity.

FIGS. 9, 10, and 11 illustrate the usage of a weight B adjustably positioned in respect to the body of the lure and the line 18. The lure is provided with decorative features consistent with the lure being configured to run to the left or to the right by adjustment of the weight from solid line to a broken line position in FIGS. 9 and 10. The body of the lure of FIG. 9, 10 and 11 has a wall D but the tunnel is omitted. While lures having desired action are possible without the tunnel, it is believed to be important to include a tunnel because of increased stability and better tracking provided thereabout.

The lures of each of the embodiments illustrated in the drawings except those in FIGS. 1, 2, and 3 may best be constructed of molded plastic. The molded plastic may be facilitated through the use of molds preferably having a single parting line arranged in such a way as to provide a cavity 20 within the walls of the lure body so as to afford buoyancy to the body.

Figure 12:
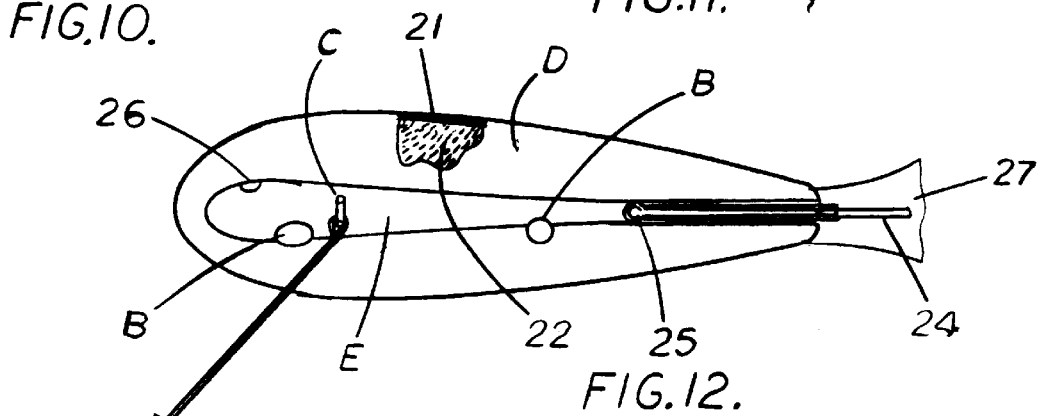
FIG. 12 is a side elevation of another modified form of the invention with parts broken away illustrating the upright wall, a variation in weight configuration, the use of a weedless hook, and an interior foam filled cavity.
Figure 13:
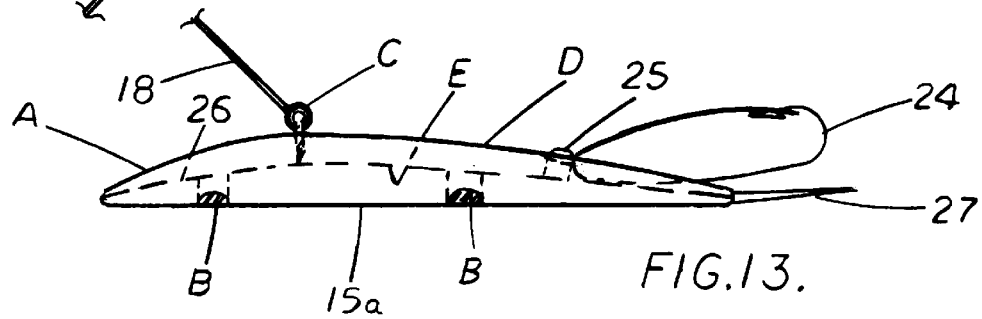
FIG. 13 is a bottom plan view further illustrating the lure of FIG. 12.
Figure 14:
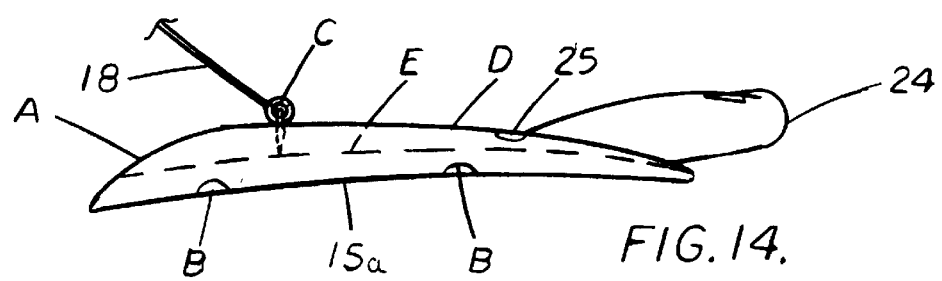
FIG. 14 is a side elevation of the lure shown in FIGS. 12 and 13 which is slightly modified to include a slight concave bow or bend extending from front to rear of the lure body.

FIGS. 12 and 13 illustrate a further modified form of the invention wherein the body is constructed of molded foam. The molded foam itself provides a cavity between walls 21 which may be lacquered or otherwise treated. The foam is illustrated as at 22 while the cavity 20 is entirely hollow. The body may be preferably injection molded of clear plastic. A weedless hook 24 is illustrated as being connected as by a screw 25 in a back end of the tunnel E. A more pronounced cavity at the front of the tunnel as illustrated at 26 in FIG. 12 provides a noise as results from a splitting action in the water. A flexible tail may also be added as illustrated at 27. FIG. 14 illustrates a variation in the lure of FIGS. 12 and 13 including a concave bow extending from front to rear of the body as at 15a to vary slightly the action of the lure providing a flutter during the run on retrieval.

Many variations may be made by adjustment of the components of the lures illustrated and described. Weighting, for example, may take many forms. If desired, rattler weights may be utilized instead of the lead weights shown in the drawings. Positioning of the weights may be adjusted as may line positioning and body shape within limits defined by the claims and the skill of lure manufacturers. Manufacturing techniques may include injecting molding of resin foam or the use of other buoyant material which will avoid taking up excess water in normal use.

Important advantages of lures constructed in accordance with the invention include the ability to stay in a productive area longer and cover more water on a given cast and retrieval than prior lures because of the right and left runs together with the ability to back up. Such lures are capable of use in areas having many obstructions where no lure has been able to go before. These and other objects may be achieved by varying and fine tuning the claimed elements.

While a preferred embodiment of the invention has been described using specific terms, such description is for illustrative purposes only, and it is to be understood that changes and variations may be made without departing from the spirit or scope of the following claims.

What is claimed is:

1. A fishing lure for providing a lateral surface run during retrieval comprising:
   an elongated horizontal body having a head with a front end;
   a body profile including a surface tapering inwardly from the head rearwardly along the body generally in the shape of a minnow;
   a weight carried by the body for aiding in positioning the body in upright position during retrieval;
   a generally upright front surface extending substantially from top to bottom of the lure substantially smoothly at an acute angle in at least one generally planar uninterrupted surface across the body at the front end of the lure for aiding in guiding the lure laterally;
   a line connector fixed on a forward portion of the body on the side of the lure sufficiently distant from the front end of the head for causing the body to extend at an angle to the line for orienting the upright front surface to guide the lure on a lateral run of the lure during retrieval; and
   a fishhook connector fixed to the body for fastening at least one fishhook to the body.

2. The fishing lure set forth in claim 1 wherein said line connector is fixed on the body rearwardly of the front surface from about ¼ to about ⅓ the distance from the front end to a rear end of the body.

3. The fishing lure set forth in claim 2 wherein said one side includes a surface defining an upright wall extending from a juncture with the upright front surface rearwardly of the body.

4. The fishing lure set forth in claim 3 including a tunnel opening at a front central portion of the wall and extending in said wall rearwardly of the body, and wherein the line connector is positioned centrally between an upper and lower edge of the tunnel.

5. The fishing lure set forth in claim 4 wherein said weight is positioned in a lower portion of the body, and said wall has a height exceeding a width of the body.

6. The fishing lure set forth in claim 5 wherein the upright front surface is an integral part of the body.

7. The fishing lure set forth in claim 6 wherein the body has an arcuate side surface opposite the wall.

8. The fishing lure set forth in claim 7 including decorative features on the body simulating a natural bait fish.

9. The fishing lure set forth in claim 7 wherein the body is constructed of molded plastic providing an internal cavity so that the body floats or has a substantially neutral buoyancy.

10. The fishing lure set forth in claim 1 wherein the body has a concave bow extending from front to rear of the body.

11. A method of providing a fishing lure having a lateral surface run during retrieval comprising the steps of:

forming a minnow shaped elongated body having a head with a front end;

utilizing an upright forwardly facing front surface in said body inclined at an acute angle at the front end ext ending substantially from top to bottom of the lure substantially smoothly in at least one generally uninterrupted surface across the body at the front end of the lure for providing guidance in a lateral direction when retrieving the lure;

weighting a lower portion of the body maintaining a generally upright position of the lure during retrieval;

fixing a line connector on a forward portion of the body on the side of the lure from about ¼ to about ⅓ the length of the body from the front end of the head to cause the line to extend at an angle to the body providing a lateral run of the lure during retrieval; and providing a fastener for attaching at least one fishhook to the body.

12. The method set forth in claim 11 including the steps of making the one side generally flat; and forming an elongated central tunnel in the flat side opening adjacent to the upright front surface and extending rearwardly of the body.

* * * * *